United States Patent
Sharifi et al.

(10) Patent No.: US 11,531,453 B2
(45) Date of Patent: Dec. 20, 2022

(54) STRUCTURED RESPONSE SUMMARIZATION OF ELECTRONIC MESSAGES

(71) Applicant: Google LLC, Mountain View, CA (US)

(72) Inventors: Matthew Sharifi, Kilchberg (CH); Jakob Nicolaus Foerster, Zurich (CH)

(73) Assignee: Google LLC, Mountain View, GA (US)

( * ) Notice: Subject to any disclaimer, the term of this patent is extended or adjusted under 35 U.S.C. 154(b) by 720 days.

(21) Appl. No.: 15/433,587

(22) Filed: Feb. 15, 2017

(65) Prior Publication Data

US 2018/0232127 A1    Aug. 16, 2018

(51) Int. Cl.
*H04L 51/02* (2022.01)
*G06F 3/04842* (2022.01)
*H04L 51/04* (2022.01)
*G06N 20/00* (2019.01)
*G06Q 10/10* (2012.01)
*G06F 40/166* (2020.01)
*H04L 51/42* (2022.01)

(52) U.S. Cl.
CPC ........ *G06F 3/04842* (2013.01); *G06F 40/166* (2020.01); *G06N 20/00* (2019.01); *G06Q 10/107* (2013.01); *H04L 51/02* (2013.01); *H04L 51/04* (2013.01); *H04L 51/42* (2022.05)

(58) Field of Classification Search
CPC ... H04L 12/1813; H04L 51/04; H04L 51/043; H04L 51/12; H04L 51/16; H04L 51/32; H04L 51/34; G06Q 50/01
See application file for complete search history.

(56) References Cited

U.S. PATENT DOCUMENTS

| | | | |
|---|---|---|---|
| 8,335,827 B2 | 12/2012 | Mishchenko | |
| 2005/0262199 A1 | 11/2005 | Chen et al. | |
| 2008/0281922 A1 | 11/2008 | Renshaw et al. | |
| 2008/0281927 A1 | 11/2008 | Vanderwende et al. | |

(Continued)

OTHER PUBLICATIONS

PCT International Search Report and Written Opinion dated Jan. 8, 2018 for PCT International Application No. PCT/US2017/059360, 15 pages.

(Continued)

*Primary Examiner* — Jennifer N Welch
*Assistant Examiner* — Amy P Hoang
(74) *Attorney, Agent, or Firm* — Shumaker & Sieffert, P.A.

(57) ABSTRACT

A system and method for grouping and organizing structured responses in a communication application at a computing device. A structured question in a plurality of messages can be detected based on a structured question model trained via machine learning. A structured question can be a question predicted by the structured question model to have a number of possible answers fewer than a threshold. A user interface element, corresponding to the structured question, can include a structured summarization that includes one or more answers to the structured question present in the plurality of messages from the plurality of users, and/or a structured response template in which at least a subset of possible answers are presented and are selectable. A command to include the generated graphical user interface element in a record of the communication session in a graphical user interface corresponding to the communication application.

21 Claims, 7 Drawing Sheets

(56) References Cited

U.S. PATENT DOCUMENTS

| | | |
|---|---|---|
| 2008/0313180 A1 | 12/2008 | Zeng et al. |
| 2010/0332518 A1 | 12/2010 | Song et al. |
| 2011/0040662 A1* | 2/2011 | Kurtzig ................. G06Q 10/10 |
| | | 705/30 |
| 2013/0006973 A1 | 1/2013 | Caldwell et al. |
| 2013/0007037 A1 | 1/2013 | Azzam et al. |
| 2015/0074194 A1 | 3/2015 | Schabes et al. |
| 2015/0088921 A1* | 3/2015 | Somaiya ............... G06F 16/951 |
| | | 707/767 |
| 2015/0120680 A1 | 4/2015 | Alonso et al. |
| 2015/0178392 A1* | 6/2015 | Jockisch ............ G06F 16/9535 |
| | | 707/706 |
| 2016/0006775 A1* | 1/2016 | Baldwin ................ G06Q 50/01 |
| | | 715/753 |
| 2016/0182430 A1* | 6/2016 | Sachidanandam .. H04M 1/7243 |
| | | 715/752 |
| 2017/0063745 A1* | 3/2017 | Banerjee ............ G06Q 30/0203 |
| 2018/0137433 A1* | 5/2018 | Devarakonda ......... G06N 5/022 |
| 2018/0196812 A1* | 7/2018 | Gupta ................... G06F 16/335 |

OTHER PUBLICATIONS

Rambow, O. et al., "Summarizing Email Threads," Proceeding HLT-NAACL-Short '04 Proceedings of HLT-NAACL 2004: Short Papers, Boston, Massachusetts—May 2-7, 2004, pp. 105-108.

Owen Rambow, et al., "Summarizing email threads", May 2, 2004; May 2, 2004-May 7, 2004, XP058314033, ISBN: 978-1-932432-24-4, May 2, 2004, 105-108 pages.

WIPO, International Preliminary Report on Patentability mailed for International Application No. PCT/US2017/059360, dated Aug. 29, 2019, 9 pages.

\* cited by examiner

STRUCTURED RESPONSE SUMMARIZATION OF ELECTRONIC MESSAGES

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

In typical communication applications, text-based messages in a communication session (such as an instant message, short message service message, email message, or social network message/posting) are presented chronologically in a list in a graphical user interface of the communication application displayed by a computing device. A communication session may include many messages that were sent over a long period of time (days, weeks, etc.). In order for a user to find a previously sent message of interest, the user may have to scroll through the list of messages, and scan the contents of each of the messages to locate the desired message (or collection of messages). In some situations, the user may remember an approximate date/time of the message of interest, which may be used to narrow the possible locations of the message of interest for the user. Nonetheless, even when the user has a general idea of the approximate date and time of a message of interest, locating the specific message of interest may be a time consuming and bothersome process.

A user may utilize a communication application to perform collaborative tasks with a group of people, such as event planning, sharing and discussing certain topics, or asking for advice or guidance with respect to a certain topic. In such situations, a question may be asked, and an answer may be given by each user. Due to the chronological presentation of text-based messages in typical communication applications, it may be difficult for a user to quickly find the answers of the users, or even keep track of whether each user has responded to a question.

SUMMARY

According to various implementations of the present disclosure, a method for grouping and organizing structured responses in a communication application at a computing device is disclosed. The method can include receiving, at a computing device executing a communication application, a plurality of messages corresponding to a communication session between a plurality of users. The method can also include detecting a structured question in the plurality of messages based on a structured question model trained via machine learning. A structured question can be a question predicted by the structured question model to have a number of possible answers fewer than a threshold. A user interface element corresponding to the structured question can be generated. The user interface element can include at least one of: (i) a structured summarization that includes one or more answers to the structured question present in the plurality of messages from the plurality of users, and (ii) a structured response template in which at least a subset of the possible answers are presented and are selectable. The method can also include outputting a command to include the generated user interface element in a record of the communication session in a graphical user interface corresponding to the communication application.

The present disclosure is further directed to a non-transitory computer-readable storage medium having a plurality of instructions stored thereon, which, when executed by one or more processors, cause the one or more processors to perform operations of the methods described herein. The present disclosure is also directed to a computing device comprising one or more processors executing a communication application for a first user, and a non-transitory computer-readable storage medium having a plurality of instructions stored thereon, which, when executed by the one or more processors, cause the one or more processors to perform operations of the methods described herein.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
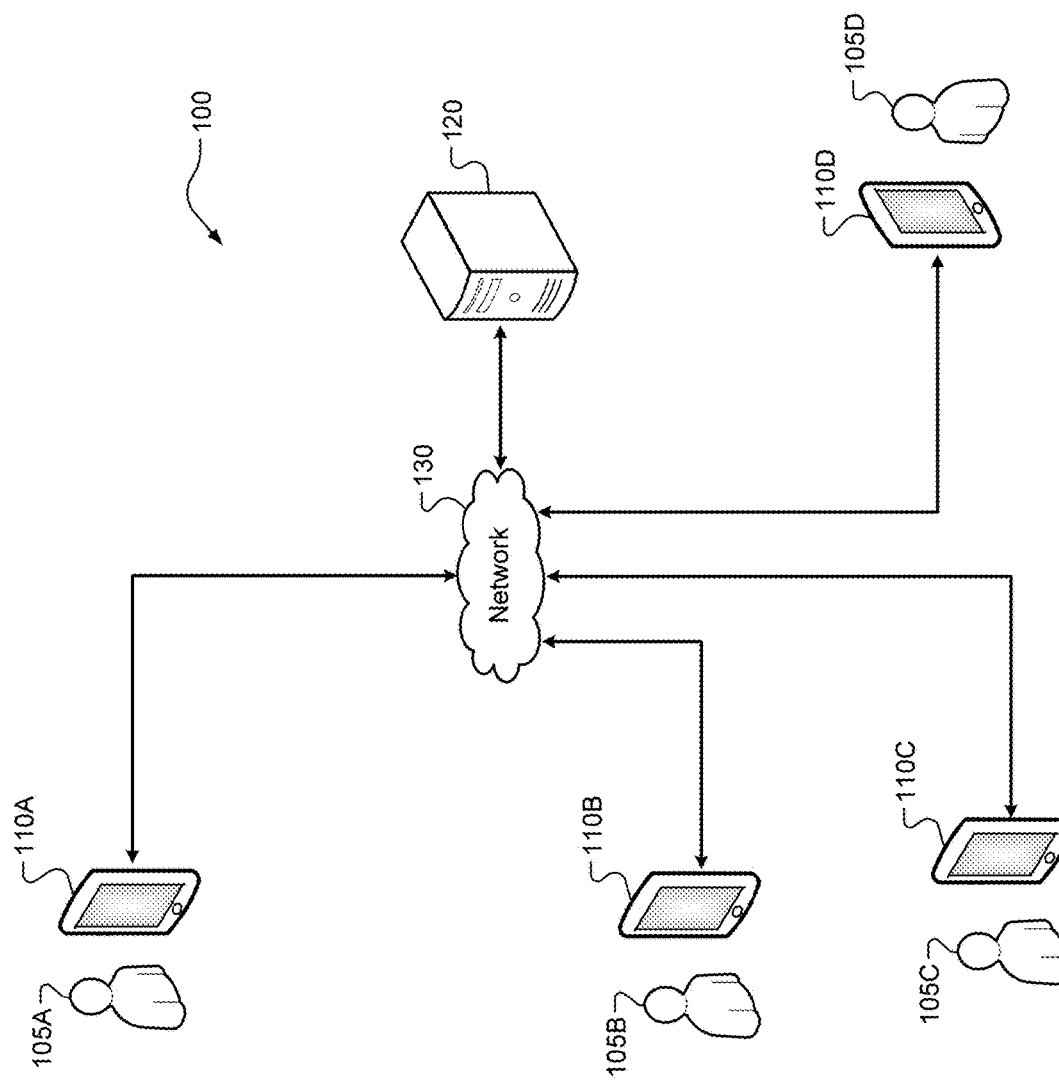
FIG. 1 is a diagram of an example computing system including four example computing devices and an example server computing device according to some implementations of the present disclosure.

As mentioned above, text-based messages (instant messages, short message service messages, email messages, social network messages/postings, etc.) in typical communication applications executing at a computing device (such as a mobile phone) are displayed in a graphical user interface in a chronologically ordered list. A typical use for such a communication application is to perform a collaborative task with a group of people, such as planning an event, sharing and discussing a certain topic, and asking and answering question(s). For example only, a question may be asked and each of the users will provide an answer to that question at a different time over a relatively long period of time.

Due to the time difference between responses, it is not unusual for further messages (that are not answers or even related to the question) to be sent to the group before each and every user has an opportunity to respond. Additionally, it is common for not all users in a group to be active in the communication application at the same time. Accordingly, a user may open a communication application to a group messaging session in which a large number of unread messages from various other users in the group are present. Due to the typical chronological presentation of text-based messages in typical communication applications, it may be difficult for a user to quickly find the answers of the others users and/or even keep track of whether each user has responded to the question.

Furthermore, due to the relatively small display size of most mobile phones and the portion of a display of a computing device that is typically allocated to the communication application, the user may also have to provide a large number of repetitive inputs (e.g., swipes, pressing an arrow or page up/down key) to scroll through a long list of messages to find all of the messages (e.g., answers) of interest. The computing device must receive and process each of the user inputs, and then execute the function associated with each user input. It is not unusual for the user to scroll back and forth between messages of interest (e.g., a question and the answers) in order to properly interpret an answer to a question, or even identify that the message is an answer to a specific question. Thus, the computing device may have to retrieve from memory and display many messages that are of no interest to the user, or the same messages repeatedly, which results in increased power consumption of the computing device. Furthermore, a reduction in the number of user inputs required for the user to retrieve desired messages may also result in the more efficient use of computing resources.

Thus, the present disclosure addresses various technical problems, including, but not limited to, reducing the number of user inputs to a computing device to obtain a desired result/action, reducing the number of operations (memory retrieval, etc.) of a computing device to obtain a desired result/action, increasing the efficient utilization of computing resources, reducing power consumption by a computing device, and the efficient aggregation and presentation of information to a user.

The present disclosure is directed to automated techniques for grouping and organizing structured responses in a communication application at a computing device. A computing device executing a communication application can receive a plurality of text-based messages between a plurality of users in a communication session. The text-based messages are evaluated to detect a structured question in the plurality of messages. For example only, a structured question is a question to which there are a relatively limited number of possible answers, e.g., a question to which a number of possible answers is fewer than a threshold. The detection of a structured question can be based on a structured question training model that has been trained via machine learning (supervised, unsupervised, etc.). In some aspects, the detection of a structured question can additionally or alternatively be based on responses to a question, e.g., when responses to a question fall into a limited set of options.

Upon detection of a structured question, the computing device generates a user interface element corresponding to the structured question for display to the users. The user interface element can take different forms. In some aspects, the user interface element can include a structured summarization that includes one or more answers to the structured question that are actually present in the plurality of messages from the plurality of users, e.g., a summary of the question and the received answers from the group. In other aspects, the user interface element can additionally or alternatively include a structured response template in which at least a subset of the possible answers are presented and are selectable for a user, e.g., to provide a quick select answer option for a user.

The computing device can output a command include the generated user interface element in the record of the communication session in a graphical user interface corresponding to the communication application. For example only, the text-based messages may be displayed by the computing device in a chronologically ordered list in the graphical user interface of the communication application. In some aspects, the user interface element can be automatically displayed in a portion of the graphical user interface of the communication application. In additional or other aspects, the user interface element can be displayed in a portion of the graphical user interface of the communication application in response to a user selecting a selectable option in the graphical user interface. The selectable option can, e.g., by a toggle switch that turns on/off the structured response functionality of the communication application.

In this manner, the present disclosure may provide one or more benefits, including, but not limited to, a cleaner, less cluttered user interface for a communication application, a more efficient or decrease in the use of computational resources, a reduction in power use of the computing device, and a reduction in the number of user inputs to obtain a desired result. For ease of description, the techniques of the present disclosure will be described in the context of a communication application that sends and receives messages. It should be appreciated, however, that the present disclosure is directed to any type of communication application that is utilized to transmit, post, etc. text-based messages, including, but not limited to, an instant messaging application, a social network, an email application, a bulletin board or other message posting service/website. Furthermore, it is specifically contemplated that the term text-based message as used herein can include messages that include pictures, graphics, emoji, etc. alone or in combination with text.

Referring now to FIG. 1, a diagram of an example computing system 100 is illustrated. The computing system 100 can be configured to implement a communication network amongst a plurality of users via their computing devices. The computing system 100 can include a plurality of example computing devices 110 and an example server 120 that communicate via a network 130 according to some implementations of the present disclosure.

For ease of description, in this application and as shown in FIG. 1, four example computing devices 110 are illustrated and described: a first computing device 110A that is associated with a first user 105A, a second computing device 110B that is associated with a second user 105B, a third computing device 110C that is associated with a third user 105C, and a fourth computing device 110D that is associated with a fourth user 105D. It should be appreciated that each of the computing devices 110A-D can both send and receive messages and, thus, can be described as a "sending" computing device or a "receiving" computing device (and, similarly, the "sending" user or the "receiving" user) depending on the circumstances and the particular message that is being discussed. Thus, the term "computing device 110" shall be used herein to refer to any of the computing devices 110A-D, alone or in combination. Further, the term "user 105" as used herein can include not just human users, but also a computing device that is executing a program (such as, an Artificial Intelligence program or other form of chatbot) that simulates how a human user would converse in the communication application.

Figure 2:
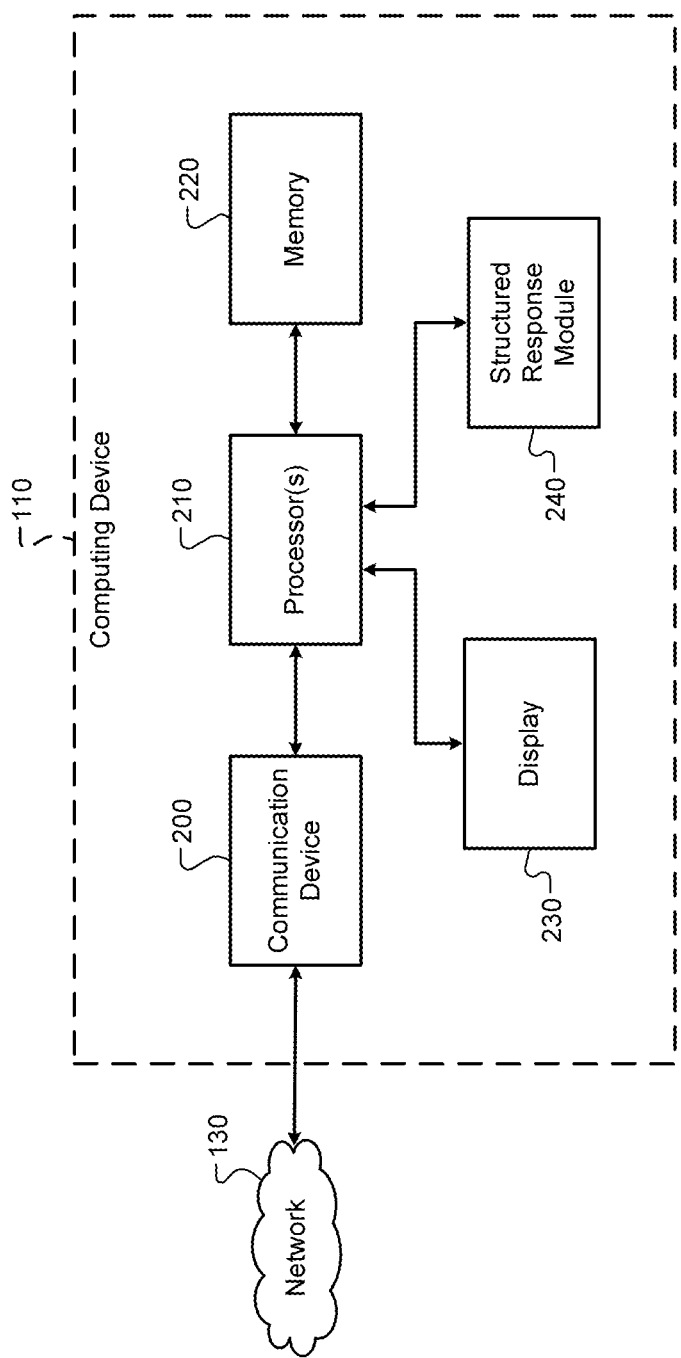
FIG. 2 is a functional block diagram of one example computing device of FIG. 1.

While illustrated as mobile phones ("smart" phones), each computing device 110 can be any type of suitable computing device, such as a desktop computer, a tablet computer, a laptop computer, a wearable computing device such as eyewear, a watch or other piece of jewelry, or clothing that incorporates a computing device. A functional block diagram of an example computing device 110 is illustrated in FIG. 2.

The computing device 110 can include a communication device 200, one more processors 210, a memory 220, a display device 230, and a structured response module 240. The processor(s) 210 can control operation of the computing device 110, including implementing at least a portion of the techniques of the present disclosure. The term "processor" as used herein is intended to refer to both a single processor and multiple processors operating together, e.g., in a parallel or distributed architecture.

The communication device 200 can be configured for communication with other devices (e.g., the server 120 or other computing devices 110) via the network 130. One non-limiting example of the communication device 200 is a transceiver, although other forms of hardware are within the scope of the present disclosure. The memory 220 can be any suitable storage medium (flash, hard disk, etc.) configured to store information. For example, the memory 220 may store a set of instructions that are executable by the processor 210, which cause the computing device 110 to perform operations, e.g., such as the operations of the present disclosure. The display device 230 can display information to the user 105. In some implementations, the display device 230 can comprise a touch-sensitive display device (such as a capacitive touchscreen and the like), although non-touch display devices are within the scope of the present disclosure.

The structured response module 240 can perform a number of functions related to the techniques of the present disclosure. For example only, the structured response module 240 can include one or more neural networks and/or other trained models that are configured to evaluate a plurality of messages to detect a structured question discussed therein. Further, the structured response module 240 can include models for determining the number of possible answers to a structured question candidate. Based on the number of possible answers to a structured question candidate, the structured response module 240 can detect and identify structured questions, possible answers, and/or previously provided answers to structured questions. The structured response module 240 can also compare the number of possible answers to a structured question candidate to a threshold, e.g., in order to detect whether the structured question candidate is, in fact, a structured question.

Although illustrated as a separate element, it should be appreciated that the structured response module 240 can be partially or wholly implemented by processor 210 and/or the memory 220 (e.g., a database storing the parameters of the various models). The structured response module 240 and its functions are more fully discussed below.

It should be appreciated that the example server computing device 120 can include the same or similar components as the computing device 110, and thus can be configured to perform some or all of the techniques of the present disclosure, which are described more fully below. Further, while the techniques of the present disclosure are described herein in the context of a computing device 110, it is specifically contemplated that each feature of the techniques may be performed by a computing device 110 alone, a plurality of computing devices 110 operating together, a server computing device 120 alone, a plurality of server computing devices 120 operating together, and a combination of one or more computing devices 110 and one or more server computing devices 120 operating together. Thus, for the sake of simplicity, in the following description the term "computing device 110" should be interpreted to include all of these various options, including the use of server computing device(s) 120 alone.

Figure 3:
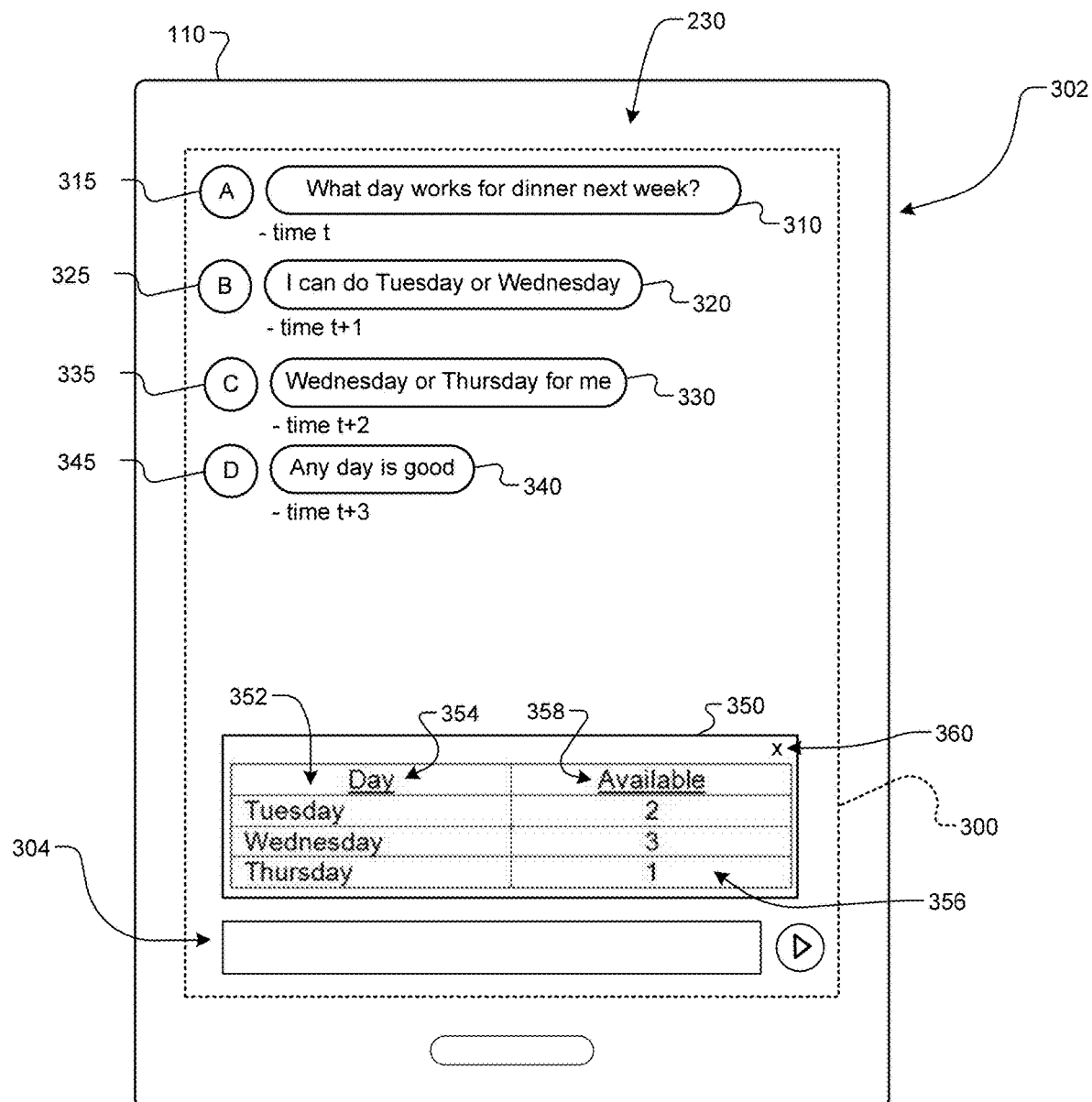
FIG. 3 is a diagram of an example graphical user interface according to some implementations of the present disclosure.

With reference to FIG. 3, an example GUI 300 that can be displayed by the display device 230 of the example computing device 110 when executing a communication application according to certain implementations of the present disclosure is shown. The illustrated GUI 300 includes a message display portion 302 and a message input portion 304. Messages that are sent or received can be displayed in the message display portion 302, and a user 105 can provide textual or other input in the message input portion 304, e.g., via a virtual keyboard (not shown) or other user input device.

A first message 310 can be received by the computing device 110. The first message 310 includes content that can, e.g., include text such as one or more words. In the illustrated example, the first message 310 includes the text content "What day works for dinner next week?" The first message 310 is associated with a timestamp of "time t" and was sent by the first user 105A via the sending computing device 110A (as indicated by a user identifier 315, e.g., the circled "A" as shown). The first message 310 can be displayed in the message display portion 302. Each user 105A-D associated with a computing device 110A-D can read or otherwise perceive the text content of the first message 310 (e.g., by hearing an audio output representative of the text content via a text-to-speech functionality). In the illustrated example, user 105B (as indicated by a user identifier 325) has responded with a second message "I can do Tuesday or Wednesday" 320 as shown.

A third message of "Wednesday or Thursday for me" 330 can be received at time t+2, which is followed by a fourth message of "Any day is good" 340 at time t+4. Each of these messages can be displayed, as shown in FIG. 3, in chronological order in the GUI 300. The third message 330 was sent by user 105C and the fourth message was sent by user 105D, as indicated by user identifiers 335, 345, respectively.

As mentioned above, displaying messages 310-340 from a communication session in a chronological list (e.g., as shown in FIG. 3) may, in some circumstances, result in an inefficient use of computing resources, available display space, and/or power consumption of the computing device 110. This may be particularly true for a communication session that includes a relatively high number of messages and/or is of a relatively long duration as such communication sessions tend to be more difficult for a user 105 to efficiently search. In order to address these and other issues, the present disclosure is directed to automated techniques for detecting structured questions and presenting a user interface element that presents a summary and/or structured response template of the possible answers to a structured question.

As shown in FIG. 3, an example user interface element 350 can comprise a structured summarization that includes one or more answers 352 to the structured question ("What day works for dinner next week?") 310. In the illustrated example, the one or more answers 352 include "Tuesday," "Wednesday," and "Thursday" and are organized in a column of a table that is provided with a label 354 ("Day"). The structured summarization 350 also includes a received answer summary 356 that summarizes the answers received from the users 105 during the communication session. The received answer summary 356 is shown as being organized in another column of the table that is provided with a label 358 ("Available"). Further, the user interface element 350 can include a selectable option 360 that selectively opens and closes the user interface element 350 upon selection by the user 105. As mentioned above, the user interface element 350 can be automatically displayed in the graphical user interface 300, or be displayed upon selection of the selectable option 360 by the user 105.

A user 105 viewing the example user interface element 350 can quickly and easily process the contents of the plurality of messages to note that users 105 have provided a number of answers to the structured question ("What day works for dinner next week?") 310. Specifically, a user 105 can review the structured summarization to note that two users 105 are available on Tuesday, three users 105 are available on Wednesday, and one user 105 is available on Thursday.

Figure 4A:
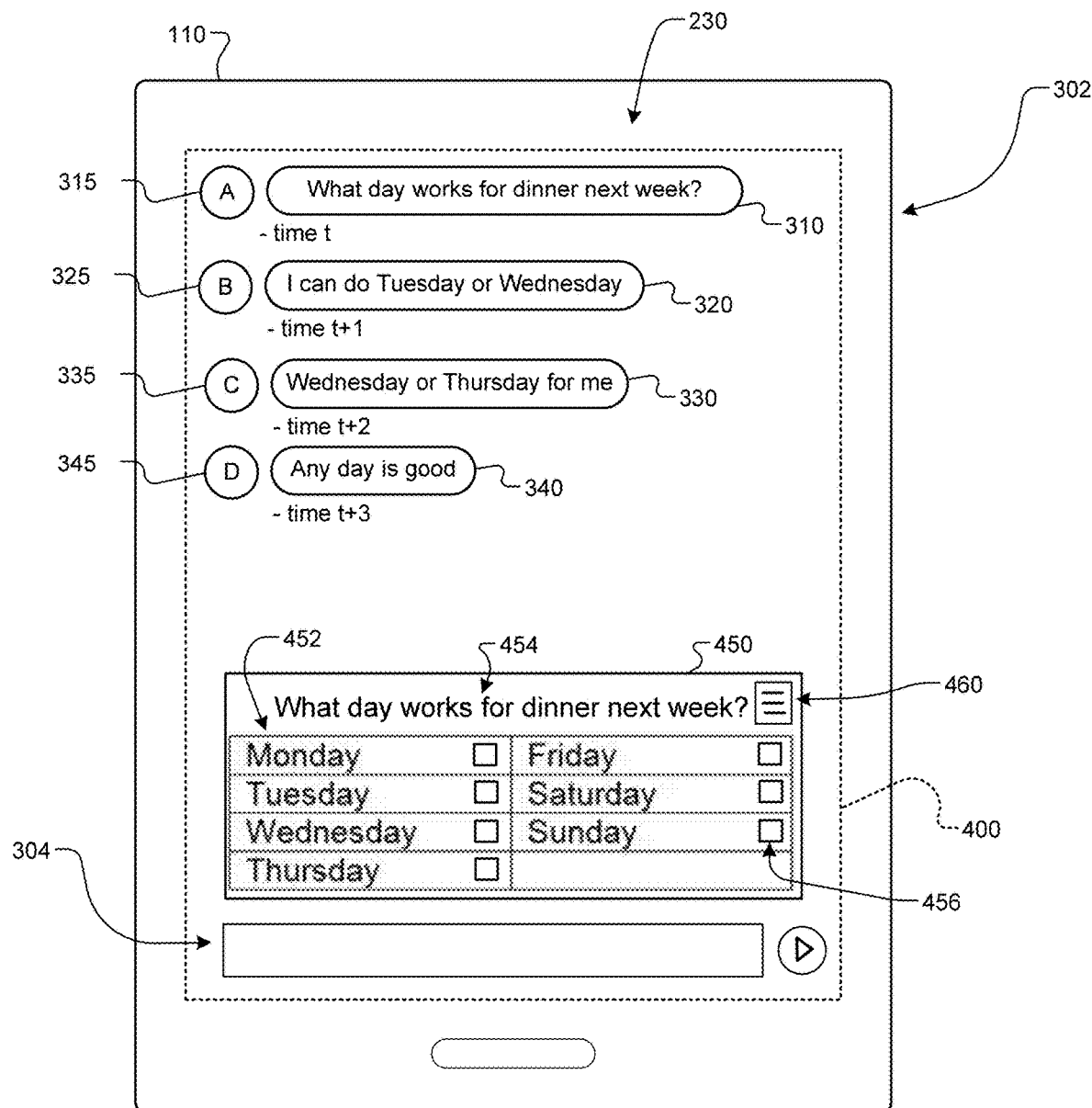
FIG. 4A is a diagram of another example graphical user interface according to some implementations of the present disclosure.
Figure 4B:
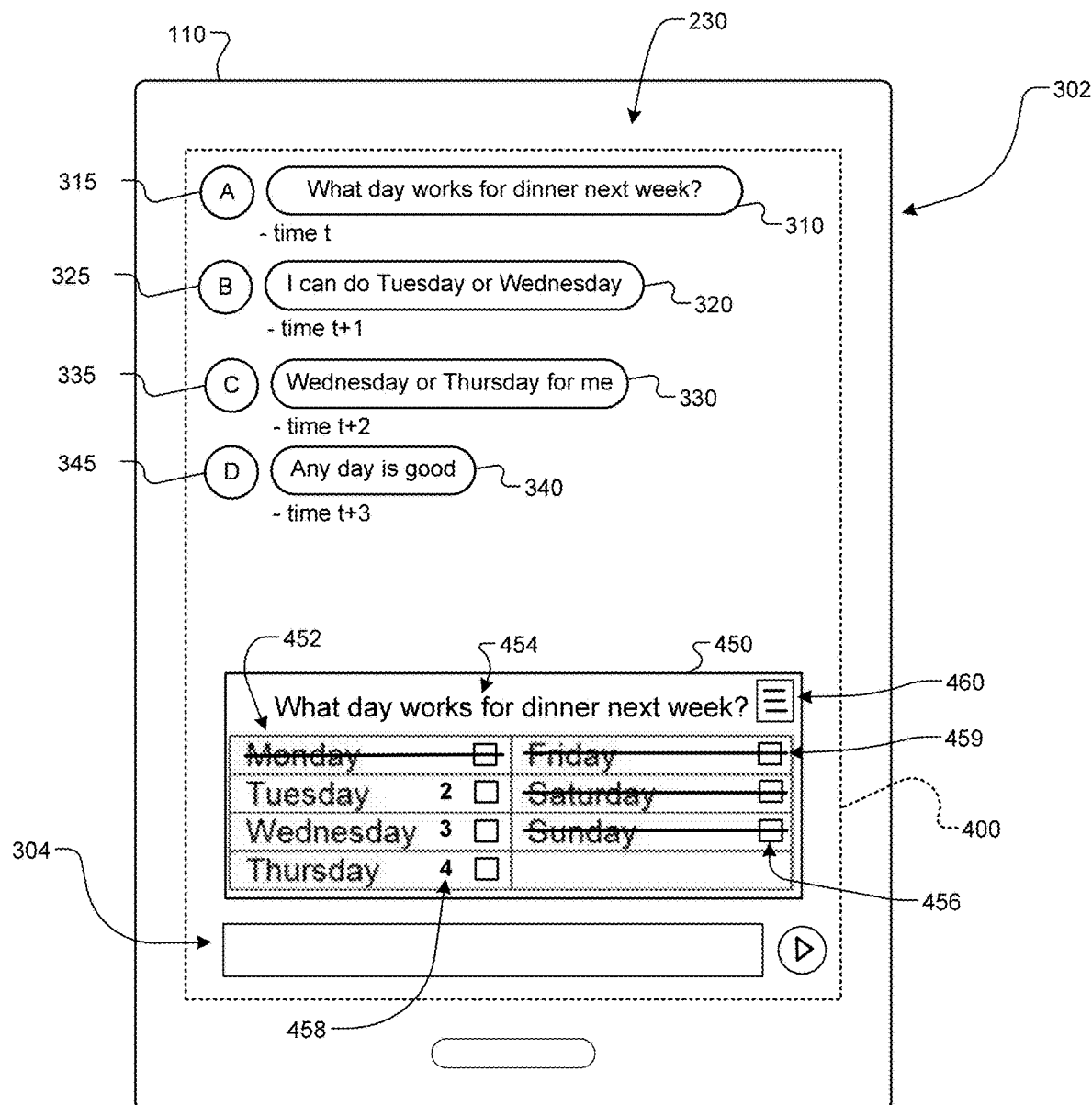
FIG. 4B is a diagram of another example graphical user interface according to some implementations of the present disclosure.

Referring now to FIGS. 4A and 4B, another example GUI 400 that can be displayed by the display device 230 of the example computing device 110 when executing a communication application according to certain implementations of the present disclosure is shown. Example GUI 400 includes similar elements to the GUI 300 discussed above, and the same reference numerals are utilized to illustrate the same elements. GUI 400 further includes another example user interface element 450, described more fully below.

The illustrated GUI 400 includes an example user interface element 450 that comprises a structured response template in which at least a subset of the possible answers 452 to the structured question ("What day works for dinner next week?") 310 is presented. In the illustrated example, the one or more answers 452 include the days of the week and are organized in a table that is provided with a label 454 ("What day works for dinner next week?") corresponding to the structured question 310. Each of the one or more answers 452 can be selectable by a user 105, e.g., by clicking on a specific answer or selecting a selectable option 456 (illustrated as a selectable or "check" box), as described more fully below. Further, the user interface element 450 can include a selectable option 460 that selectively opens and closes the user interface element 450 upon selection by the user 105. As mentioned above, the user interface element 450 can be automatically displayed in the graphical user interface 300, or be displayed upon selection of the selectable option 460 by the user 105.

As illustrated in FIG. 4B, the structured response template 450 can optionally include a received answer summary 458 (similar to the received answer summary 356 described above) that summarizes the answers received from the users 105 during the communication session. The received answer summary 458 is shown as being organized in another column of the table, although other formats are contemplated.

Additionally or alternatively, in some aspects, the structured response template 450 can be modified based on the answers received from the users 105. For example only, and as shown in FIG. 4B, the subset of the possible answers 452 (or the presentation thereof) to the structured question ("What day works for dinner next week?") 310 can be modified to indicate which of the possible answers 452 are not available or have not been selected by any other user 105. In the illustrated example, a number of the possible answers 452 have been provided with a strikethrough element 459 to indicate that these possible answers 452 are not preferred/have not been selected. It should be appreciated that other manners of modifying the structured response template 450 are contemplated (highlighting, changing of color, change in font, size, removing specific possible answers from the list, etc.).

Similar to the user interface element 350, a user 105 viewing the example user interface element 450 can quickly and easily process the contents of the plurality of messages to note that users 105 have provided a number of answers to the structured question ("What day works for dinner next week?") 310. Specifically, a user 105 can review the structured response template 450 (FIG. 4B) to note that two users 105 are available on Tuesday, three users 105 are available on Wednesday, and one user 105 is available on Thursday. Furthermore, a user 105 can also identify the structured question ("What day works for dinner next week?") 310 based on the label 454.

As briefly mentioned, a selection of a particular answer of the one or more answers 452 can cause the computing device 110 to automatically generate and send a response message corresponding to the selected answer. For example only, if a particular user 105 (e.g., the first user 105A) selects the answer "Sunday" via the selectable option 456, the computing device 110 can generate a response message (e.g., containing the text "Sunday" or "User A says 'Sunday'"). The generated response message can be automatically transmitted to the other users 105 in the communication session, or can be included as an auto-completed message (e.g., in the message input portion 304 of the GUI 300) for editing and/or sending by the particular user (user 105A).

Figure 5:
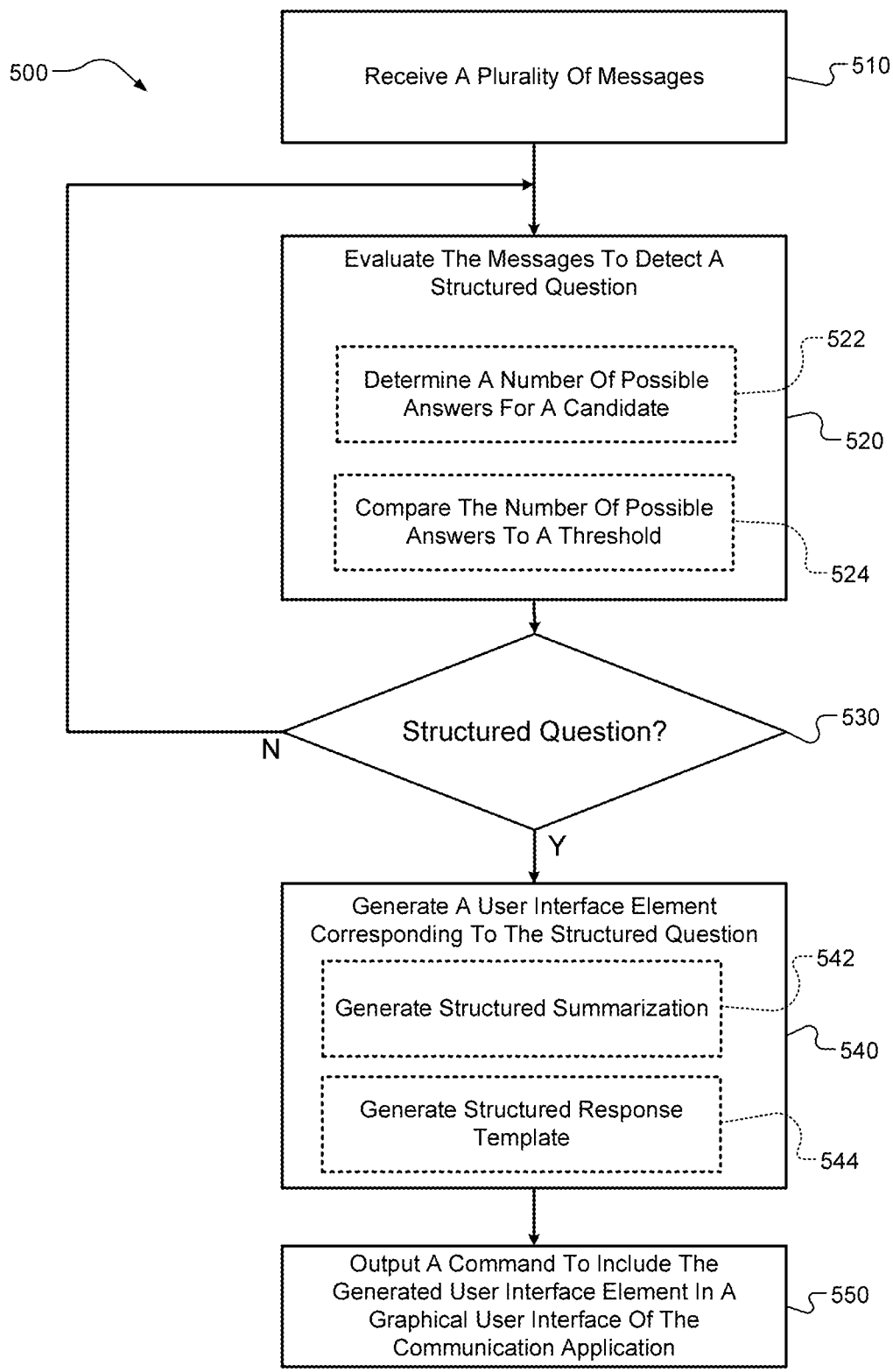
FIG. 5 is a flow diagram of an example method for grouping and organizing structured responses in a communication application according to some implementations of the present disclosure.

Referring now to FIG. 5, a method 500 for summarized a structured response in a communication session is disclosed. At 510, the computing device 110 can receive a plurality of text-based messages (such as messages 310-340) that correspond to a communication session between a plurality of users 110 (such as, a first user 110A, a second user 110B, a third user 110C, and a fourth user 110D) in a communication application executing at the computing device 110. The computing device 110 can evaluate (520) the messages 310-340 to determine whether a structured question has been asked.

As more fully described below, the computing device 110 can evaluate (520) a message as a structured question candidate based on a structured question model. In some aspects, the computing device 110 can determine (522) a number of possible answers for a structured question candidate, and compare (524) that number to a threshold. When the number of possible answers satisfies the threshold, the structured question candidate can be classified as a structured question. Conversely, when the number of possible answers does not satisfy the threshold, the structured question candidate can excluded from classification as a structured question.

At 530, the computing device 110 can detect a structured question in the plurality of messages. When a structured question candidate is not classified as a structured question at 530, the method 500 can return to 510 or 520 as shown. When a structured question candidate is classified as a structured question at 530, the computing device 110 can generate (540) a user interface element (such as, a user interface element 350, 450) corresponding to the structured question. At 550, the computing device 110 can output a command to include the generated user interface element (350, 450) in a record of the communication session in a graphical user interface (such as, GUI 300, 400) corresponding to the communication application.

As described above, the user interface element can take various forms, such as the example user interface elements 350, 450. In some aspects, the user interface element can be generated (542) to include a structured summarization that includes one or more answers to the structured question present in the plurality of messages from the plurality of users, such as the user interface element 350. In other aspects, the user interface element can be generated (544) to a structured response template in which at least a subset of the possible answers are presented and are selectable, such as the user interface element 450.

Figure 6:
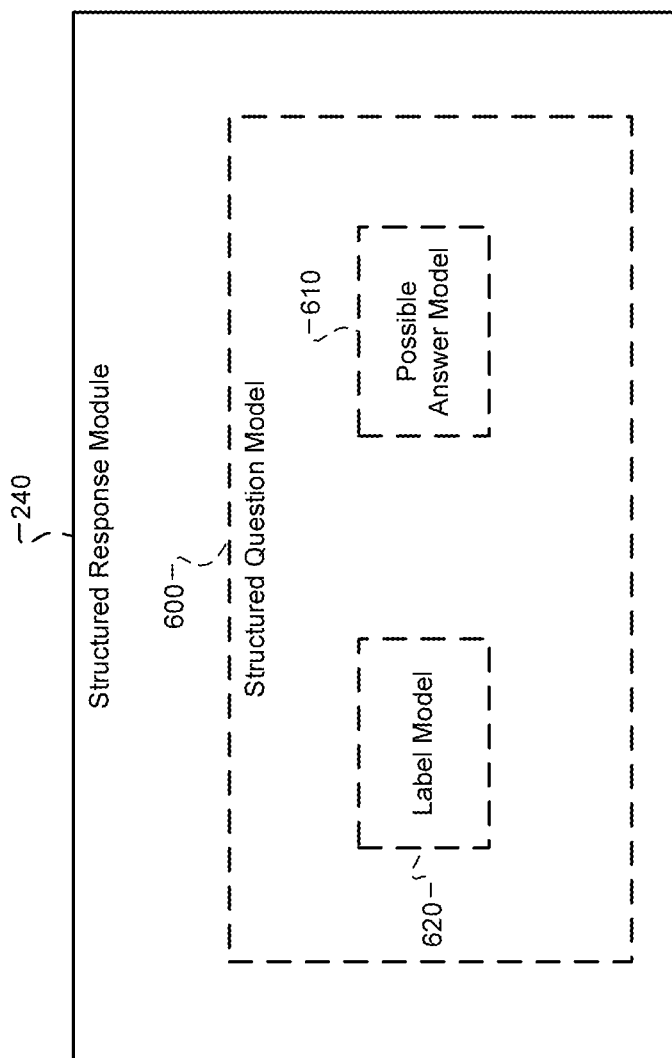
FIG. 6 is a functional block diagram of the example structured response module of FIG. 2.

With additional reference to FIG. 6, example components of a structured response module 240 are illustrated. As mentioned above, the structured response module 240 can perform (alone or in conjunction with other computing devices or components thereof) one or more of the functions related to the method 500. The structured response module 240 can include a structured question model 600 that can be utilized to evaluate (520, 522, 524) the messages 310-340 to detect a structured question. The structured question model 600 can comprise a neural network or other type of model that is trained via machine learning to detect and identify structured questions in a plurality of messages. In some aspects, the structured question model 600 can comprise a machine learning classifier trained to identify structured questions from labeled training data. In various implementations, the machine learning model can be trained based on labeled training data comprising a plurality of messages each of which being labeled as either a structured question or as not a structured question.

The structured question model 600 can detect a structured question based on many factors or signals. For example only, the structured question model 600 may utilize punctuation present in a message as a signal indicative of a structured question. When a structured question candidate message includes a question mark, for example, it may be more likely that the structured question candidate is a structured question because a question mark is indicative of a question. Similarly, when a punctuation mark is present but is not a question mark, it may be more likely that the structured question candidate is not a structured question because the sending user 105 included punctuation that is not indicative of a question.

As a further example, the structured question model 600 may utilize the presence of interrogative words in a message as a signal indicative of a structured question. When a structured question candidate message includes interrogative words (who, where, what, when, how, why, etc.), it may be more likely that the structured question candidate is a structured question because such words are indicative of a question. Similarly, the absence of interrogative words in a structured question candidate may be a signal that the candidate is not a structured question.

In yet another or additional example, the structured question model 600 may utilize the presence of a word indicative of a limited set of items/entities/options in a message as a signal indicative of a structured question. For example only, a structured question candidate that includes words like "What day . . . " may be indicative of a structured question because the word "day" is indicative of a limited set of options (Sunday through Saturday). In contrast, a structured question candidate that does not include words indicative of a limited set of items (e.g., "Why?" and "What are you doing?") may be a signal that the candidate is not a structured question. Each of the signals discussed above can be used separately, in combination with each other, and/or with other signals, to detect a structured question.

In yet another or additional example, the structured question model 600 may utilize the presence of a limited selection of options in the text of a message as a signal indicative of a structured question. For example only, a structured question candidate of "Do you like the red or blue?" may be indicative of a structured question because the word "or" is indicative of the options from which a user 105 may select to respond to the question. In contrast, a structured question candidate that does not include a limited selection of options ("Why do you like the blue one?") may be a signal that the candidate is not a structured question.

In a further alternative or additional example, the structured question model 600 may utilize the responses received to a message (or, question) as a signal indicative of a structured question. For example only, a structured question candidate of "What do you want to do?" may not initially be classified as a structured question. However, when different users provide responses (such as "dinner," "movie," "I prefer dinner," and "movie sounds good!") that present a limited set of options for responding to the structured candidate, the structured question model 600 may classify the structured question candidate of "What do you want to do?" as a structured question. Thus, a structured question candidate may initially be classified as not a structured question, and then re-classified as a structured question based on the responses received thereto.

For a structured question candidate, the structured question model 600 can determine (522) a number of possible answers (e.g., by utilizing the possible answer model 610 discussed below) for a structured question candidate, and compare (524) that number to a threshold. The threshold may be selected or determined in various ways. For example only, the threshold may be determined based on a size of the display 230 of the computing device 110. In this manner, when the number of possible answers for a structured question candidate would be difficult to properly display on the display 230, the structured question candidate may be classified as not a structured question. For example only, a structured question candidate of "What is your date of birth?" may be indicative of a limited set of items (i.e., dates), but the number of possible answers is relatively large, and therefore the structured question model 600 may classify the candidate as not a structured question. Similarly, a structured question candidate of "What is the date you suggested next week?" may be indicative of a limited set of items (i.e., dates next week) in which the number of possible answers is relatively small (seven), and therefore the structured question model 600 may classify the candidate as a structured question. It is contemplated that the threshold can be determined in various other manners.

As briefly mentioned above, the structured question model 600 can include a possible answer model 610 that can determine (522) a number of possible answers and the actual possible answers to a structured question. The possible answer model 610 can comprise a neural network or other type of model that is trained via machine learning to detect and identify possible answers to structured questions. The model can utilize various signals for this determination. For example only, the presence of a word indicative of a limited set of items/entities/options in a message is a signal indicating that the possible answers are the items/entities/options. In yet another example, the possible answer model 610 can be trained to detect binary questions to which there are typically only two answers (e.g., "yes" or "no").

Further, the possible answer model 600 may utilize the presence of a limited selection of options present in the text of a message as a signal indicative of the possible answers to a structured question. As mentioned above, a structured question "Do you like the red or blue?" may be indicative of the possible answers ("red" or "blue") because the word "or"

is indicative of the options from which a user 105 may select to respond to the question. Each of the signals discussed above can be used separately, in combination with each other, and/or with other signals, to detect possible answers to a structured question.

In some implementations, the structured question model 600 can also include a label model 620 that can be utilized to assist in the generation of a user interface element, such as user interface element 350, 450. More particularly, the label model 620 can be utilized to generate a label (such as labels 354, 454 described above) that corresponds to the structured question 310 and which can be included in the user interface element. In some aspects, the structured question itself can be selected as the label, such as illustrated in user interface element 450 of FIG. 4A-B. In other aspects, the label model 620 can derive the label (such as label 354 in FIG. 3) from the structured question. For example only, the label model 620 can determine a category for the possible answers, or the word indicative of the limited set of items/entities/options ("Day") present in the structured question, as the label 354, 454.

As mentioned above, in some implementations, the computing device 110 (e.g., the structured question model 600) can aggregate and summarize the answers received from the users 105 to generate a received answer summary 356, 458 for display in the user interface element 350, 450. In some aspects, the structured question model 600 can be further trained to determine messages that are answers that are responsive to structured questions. The structured question model 600 can be trained on training data comprising a collection of messages that are marked as responsive answers (positive examples) and/or non-responsive (negative examples) to determine features of messages that are indicative of responsiveness.

In some aspects, a sent time of a particular message (the sent times of messages) can be utilized to determine whether it is responsive to a structured question. For example only, it may be that a particular message with a sent time that is shortly after the sent time of a structured question indicates that the particular message is more likely to be responsive to the structured question. In another example, a difference between the sent time of the particular message and a read time of the structured question by the user 105 can be utilized to determine whether a message is responsive. Similar to the sent time example above, it may be that a particular message sent by a first user at a sent time that is shortly after the time that the first user is estimated to have read a structured question (read time) indicates that the particular message is more likely to be responsive to the structured question.

Additionally or alternatively, the content of the messages can be used to determine whether the later message is responsive to a structured question. For example only, for a structured question that includes a word indicative of a category or set of items/objects/entities (such as, "day" or "color"), a following message that includes a word indicative of a particular member/item/object in the category or set (such as "Monday" or "blue") may be more likely to be responsive to the previous message and, therefore, include an answer. In additional or alternative aspects, when an answer is provided via a structured response template 450, the computing device 110 that sends the answer message can include an answer identifier that can be detected by the receiving computing devices 110 for inclusion in a received answer summary 356, 458.

It should be appreciated that, although the various different models (600-620) are described as separate models that function separately, the present disclosure contemplates that a combination of some or all of the models (or features thereof) may be utilized by the computing device 110. Further, it is specifically contemplated that each of the described features and models can be utilized separately or together in any combination, except as noted.

The systems and methods discussed herein do not require collection or usage of user personal information. In situations in which certain implementations discussed herein may collect or use personal information about users (e.g., user data, information about a user's social network, user's location and time, user's biometric information, user's activities and demographic information), users are provided with one or more opportunities to control whether the personal information is collected, whether the personal information is stored, whether the personal information is used, and how the information is collected about the user, stored and used. That is, the systems and methods discussed herein collect, store and/or use user personal information only upon receiving explicit authorization from the relevant users to do so. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in various different forms and that neither should be construed to limit the scope of the disclosure. In some example embodiments, well-known procedures, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The term "and/or" includes any and all combinations of one or more of the associated listed items. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

As used herein, the term module may refer to, be part of, or include: an Application Specific Integrated Circuit (ASIC); an electronic circuit; a combinational logic circuit; a field programmable gate array (FPGA); a processor or a distributed network of processors (shared, dedicated, or grouped) and storage in networked clusters or datacenters that executes code or a process; other suitable components that provide the described functionality; or a combination of some or all of the above, such as in a system-on-chip. The term module may also include memory (shared, dedicated, or grouped) that stores code executed by the one or more processors.

The term code, as used above, may include software, firmware, byte-code and/or microcode, and may refer to programs, routines, functions, classes, and/or objects. The term shared, as used above, means that some or all code from multiple modules may be executed using a single (shared) processor. In addition, some or all code from multiple modules may be stored by a single (shared) memory. The term group, as used above, means that some or all code from a single module may be executed using a group of processors. In addition, some or all code from a single module may be stored using a group of memories.

The techniques described herein may be implemented by one or more computer programs executed by one or more processors. The computer programs include processor-executable instructions that are stored on a non-transitory tangible computer readable medium. The computer programs may also include stored data. Non-limiting examples of the non-transitory tangible computer readable medium are nonvolatile memory, magnetic storage, and optical storage.

Some portions of the above description present the techniques described herein in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times to refer to these arrangements of operations as modules or by functional names, without loss of generality.

Unless specifically stated otherwise as apparent from the above discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the described techniques include process steps and instructions described herein in the form of an algorithm. It should be noted that the described process steps and instructions could be embodied in software, firmware or hardware, and when embodied in software, could be downloaded to reside on and be operated from different platforms used by real time network operating systems.

The present disclosure also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a tangible computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatuses to perform the required method steps. The required structure for a variety of these systems will be apparent to those of skill in the art, along with equivalent variations. In addition, the present disclosure is not described with reference to any particular programming language. It is appreciated that a variety of programming languages may be used to implement the teachings of the present disclosure as described herein, and any references to specific languages are provided for disclosure of enablement and best mode of the present invention.

The present disclosure is well suited to a wide variety of computer network systems over numerous topologies. Within this field, the configuration and management of large networks comprise storage devices and computers that are communicatively coupled to dissimilar computers and storage devices over a network, such as the Internet.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in one or more ways. Such variations are not to be regarded as a departure from the disclosure, and all such modifications are intended to be included within the scope of the disclosure.

What is claimed is:

1. A computer-implemented method, comprising:
  receiving, at a computing device executing a communication application, a plurality of messages corresponding to a communication session between a plurality of users, wherein the plurality of messages includes a structured question candidate and one or more messages unrelated to the structured question candidate;
  determining, by a structured question model trained, to evaluate messages and to identify a structured question, whether:
    the structured question candidate is a structured question based, at least in part, on the structured question candidate including one or more words indicative of a limited set of predetermined options for possible answers and a total number of the possible answers being fewer than a threshold, wherein the limited set of predetermined options are user-selectable, and
    the structured question candidate is excluded from classification as a structured question based, at least in part, on the structured question candidate including no words that are indicative of: a limited category, a set of items, or a set of options; and in response to determining that the structured question candidate is excluded from classification as the structured question:

re-classifying the structured question candidate as a structured question based on received responses that present the limited set of predetermined options for responding to the structured question candidate; and in response to determining that the structured question candidate is the structured question:

determining from the plurality of messages including the one or more messages unrelated to the structured question candidate, one or more responses including one or more of the possible answers from the plurality of users, wherein the one or more responses each include one or more user-selected options of the limited set of predetermined options;

generating, at the computing device, a user interface element corresponding to the structured question, the user interface element including a structured summarization that includes the one or more of the possible answers from the plurality of users; and outputting, at the computing device, a command to include the generated user interface element in a graphical user interface of a display screen, corresponding to the communication application.

2. The computer-implemented method of claim 1, further comprising:

determining, at the computing device, the possible answers and the total number of the possible answers based on content of the structured question, wherein the possible answers are present in the structured question.

3. The computer-implemented method of claim 1, further comprising:

receiving, at the computing device and from a particular user, a user response including a particular possible answer; and in response to the user response, generating, at the computing device, a particular response message corresponding to the particular possible answer.

4. The computer-implemented method of claim 3, wherein generating the particular response message comprises at least one of: (i) automatically transmitting the particular response message to the plurality of users in the communication session, or (ii) inserting the particular response message in the graphical user interface corresponding to the communication application for editing or sending by the particular user.

5. The computer-implemented method of claim 1, further comprising determining a responsive message from the plurality of messages, wherein the responsive message includes at least one of the possible answers to the structured question from one of the plurality of users.

6. The computer-implemented method of claim 1, wherein the one or more responses further includes an answer identifier for inclusion in the structured summarization.

7. The computer-implemented method of claim 1, wherein the threshold is based, at least in part, on a size of the display screen.

8. A computing device, comprising:

one or more processors executing a communication application for a first user; and a non-transitory computer-readable storage medium having a plurality of instructions stored thereon, which, when executed by the one or more processors, cause the one or more processors to perform operations comprising:

receiving a plurality of messages corresponding to a communication session in the communication application between a plurality of users, wherein the plurality of messages includes a structured question candidate;

determining, by a structured question model trained to evaluate messages and to identify a structured question, whether:

the structured question candidate is a structured question based, at least in part, on the structured question candidate including one or more words indicative of the limited set of predetermined options for possible answers and a total number of the possible answers being fewer than a threshold, wherein the limited set of predetermined options are user-selectable, and the structured question candidate is excluded from classification as a structured question based, at least in part, on the structured question candidate including no words that are indicative of any of a limited category, set of items, or set of options; and in response to determining that the structured question candidate is excluded from classification as the structured question:

re-classifying the structured question candidate as a structured question based on received responses that present a limited set of options for responding to the structured question candidate; and in response to determining that the structured question candidate is the structured question:

determining one or more responses including one or more of the possible answers from the plurality of users, wherein the one or more responses each include one or more user-selected options of the limited set of predetermined options;

generating a user interface element corresponding to the structured question, the user interface element including a structured summarization that includes the one or more of the possible answers to the structured question from the plurality of users; and outputting a command to include the generated user interface element in a graphical user interface of a display screen corresponding to the communication application.

9. The computing device of claim 8, wherein the operations further comprise:

determining the possible answers and a total number of possible answers based on content of the structured question, wherein the possible answers are present in the structured question.

10. The computing device of claim 8, wherein the operations further comprise:

receiving, from a particular user, a user response including a particular possible answer; and in response to the user response, generating a particular response message corresponding to the particular possible answer.

11. The computing device of claim 10, wherein generating the particular response message comprises at least one of: (i) automatically transmitting the particular response message to the plurality of users in the communication session, or (ii) inserting the particular response message in the graphical user interface corresponding to the communication application for editing or sending by the particular user.

12. The computing device of claim 8, further comprising determining a responsive message from the plurality of messages, wherein the responsive message includes at least one of the possible answers to the structured question from one of the plurality of users.

13. The computing device of claim 8, wherein the one or more responses further includes an answer identifier for inclusion in the structured summarization.

14. The computing device of claim 8, wherein the threshold is based, at least in part, on a size of the display screen.

15. A non-transitory computer-readable storage medium having a plurality of instructions stored thereon, which, when executed by one or more processors, cause the one or more processors to perform operations comprising:
    executing a communication application;
    receiving a plurality of messages corresponding to a communication session in the communication application between a plurality of users, wherein the plurality of messages includes a structured question candidate;
    determining, by a structured question model trained to evaluate messages and to identify a structured question, whether:
        the structured question candidate is a structured question based, at least in part, on the structured question candidate including one or more words indicative of a limited set of predetermined options for possible answers and a total number of the possible answers being fewer than a threshold, wherein the limited set of predetermined options are user-selectable, and
        the structured question candidate is excluded from classification as a structured question based, at least in part, on the structured question candidate including no words that are indicative of any of a limited category, set of items, or set of options; and
    in response to determining that the structured question candidate is excluded from classification as the structured question:
        re-classifying the structured question candidate as a structured question based on received responses that present the limited set of predetermined options for responding to the structured question candidate; and
    in response to determining that the structured question candidate is the structured question:
        determining one or more responses including one or more of the possible answers from the plurality of users, wherein the one or more responses each include one or more user-selected options of the limited set of predetermined options;
    generating a user interface element corresponding to the structured question, the user interface element including a structured summarization that includes one or more of the possible answers to the structured question from the plurality of users; and
    outputting a command to generate a graphical user interface of a display screen corresponding to the communication application in which the plurality of messages and the generated user interface element are displayed.

16. The non-transitory computer-readable storage medium of claim 15, wherein the operations further comprise:
    determining the possible answers and a total number of possible answers based on content of the structured question, wherein the possible answers are present in the structured question.

17. The non-transitory computer-readable storage medium of claim 15, wherein the operations further comprise:
    determining the total number of the possible answers based on the structured question model and the structured question; and
    comparing the total number of the possible answers to the threshold.

18. The non-transitory computer-readable storage medium of claim 15, wherein the operations further comprise:
    receiving, from a particular user, a user response including a particular possible answer; and
    in response to the user response, generating a particular response message corresponding to the particular possible answer.

19. The non-transitory computer-readable storage medium of claim 18, wherein generating the particular response message comprises at least one of: (i) automatically transmitting the particular response message to the plurality of users in the communication session, or (ii) inserting the particular response message in the graphical user interface corresponding to the communication application for editing or sending by the particular user.

20. The non-transitory computer-readable storage medium of claim 15, wherein the one or more responses further includes an answer identifier for inclusion in the structured summarization.

21. The non-transitory computer-readable storage medium of claim 15, wherein the threshold is based, at least in part, on a size of the display screen.

* * * * *